United States Patent
Sasakura et al.

(10) Patent No.: US 11,802,949 B2
(45) Date of Patent: Oct. 31, 2023

(54) UNDERWATER INFORMATION VISUALIZING DEVICE

(71) Applicant: AquaFusion, Ltd., Kobe (JP)

(72) Inventors: Toyoki Sasakura, Kobe (JP); Ikuo Matsuo, Kobe (JP)

(73) Assignee: AquaFusion, Ltd., Kobe (JP)

( * ) Notice: Subject to any disclaimer, the term of this patent is extended or adjusted under 35 U.S.C. 154(b) by 364 days.

(21) Appl. No.: 17/295,727

(22) PCT Filed: Nov. 27, 2018

(86) PCT No.: PCT/JP2018/043494
§ 371 (c)(1),
(2) Date: May 20, 2021

(87) PCT Pub. No.: WO2020/110190
PCT Pub. Date: Jun. 4, 2020

(65) Prior Publication Data
US 2021/0389441 A1    Dec. 16, 2021

(51) Int. Cl.
*G01S 7/62*    (2006.01)
*G01S 15/10*    (2006.01)
(Continued)

(52) U.S. Cl.
CPC .......... *G01S 7/6218* (2013.01); *G01S 15/104* (2013.01); *G01S 15/96* (2013.01); *G06F 3/14* (2013.01); *G06T 11/203* (2013.01)

(58) Field of Classification Search
USPC ... 340/850, 851, 856.4, 943, 538.11, 538.12, 340/663, 692, 7.62, 7.57, 286.11, 328,
(Continued)

(56) References Cited

U.S. PATENT DOCUMENTS

| 5,886,950 A | 3/1999 | Billon |
| 6,179,780 B1 | 1/2001 | Hossack et al. |

(Continued)

FOREIGN PATENT DOCUMENTS

| JP | 2567641 B2 | 12/1996 |
| JP | 2002-131427 A | 5/2002 |

(Continued)

OTHER PUBLICATIONS

International Search Report dated Mar. 5, 2019 in PCT/JP2018/043494 filed on Nov. 27, 2018, 2 pages.

(Continued)

*Primary Examiner* — Daniel Previl
(74) *Attorney, Agent, or Firm* — Oblon, McClelland, Maier & Neustadt, L.L.P.

(57) ABSTRACT

An underwater information visualization device, which is installed on a moving body such as a ship traveling near a water surface and visualizes and displays information about fish in the water and the seabed using an ultrasonic wave, includes circuitry that generates a pseudo noise sequence signal and a modulation circuit that modulates a carrier signal to form a transmission signal, emits a transmission signal as an ultrasonic wave into the water, receives an echo of an ultrasonic wave, determines an echo corresponding to a transmission signal by subjecting the echo to correlation processing with a pseudo noise sequence signal, displays an output signal. The display simultaneously displays multiple reception signals on a screen, and a period of transmission signals is (2D/Vu) or less when an underwater sonic wave speed is Vu and a distance to the seabed is D.

12 Claims, 22 Drawing Sheets

(51) Int. Cl.
*G01S 15/96* (2006.01)
*G06F 3/14* (2006.01)
*G06T 11/20* (2006.01)

(58) Field of Classification Search
USPC ....... 340/815.46, 815.79, 384.2, 384.73, 904
See application file for complete search history.

(56) References Cited

U.S. PATENT DOCUMENTS

| | | | | |
|---|---|---|---|---|
| 6,472,978 | B1* | 10/2002 | Takagi | G08G 1/005 340/904 |
| 2002/0093880 | A1 | 7/2002 | Nakamura | |
| 2007/0188172 | A1* | 8/2007 | Garwood | G01R 33/446 324/307 |
| 2007/0194976 | A1* | 8/2007 | Reed | G01S 13/04 342/188 |
| 2010/0097459 | A1* | 4/2010 | Tholl | G01S 17/89 348/E5.022 |
| 2013/0148471 | A1 | 6/2013 | Brown et al. | |
| 2018/0149746 | A1* | 5/2018 | Leskiw | G01S 15/8913 |
| 2018/0217243 | A1 | 8/2018 | Sasakura et al. | |
| 2018/0278265 | A1* | 9/2018 | Tanaka | G01S 7/292 |

FOREIGN PATENT DOCUMENTS

| | | |
|---|---|---|
| JP | 2002-214341 A | 7/2002 |
| JP | 2013-137309 A | 7/2013 |
| JP | 2018-9853 A | 1/2018 |

OTHER PUBLICATIONS

Sawa et al., "Sway correction applying the cross-correlation method between received waves to a single channel synthetic aperture sonar", Acoustical Society of Japan, Proceedings of 2007 Spring Meeting of ASJ, Mar. 15, 2007, [CD-ROM], pp. 1193-1194, 4 total pages (with English Abstract).

* cited by examiner

UNDERWATER INFORMATION VISUALIZING DEVICE

CROSS-REFERENCE TO RELATED APPLICATIONS

The present application is a 35 U.S.C. § 371 national stage patent application of International patent application PCT/JP2018/043494, filed on Nov. 27, 2018, the entire contents of which is incorporated herein by reference.

TECHNICAL FIELD

The present invention relates to an underwater information visualization device and a method for visualizing and displaying information about fish in water and the seabed using ultrasonic waves.

TECHNICAL BACKGROUND

A fish finder (for example, see Patent Document 1) as one of underwater information visualization devices is known. As illustrated in FIG. 1, a fish finder emits an ultrasonic wave into the water and displays reflection signals from underwater objects that exist in the water (such as fish and floating objects in the water) or the seabed on a color liquid crystal display or the like.

A display method of a fish finder is to color an upper right corner of a liquid crystal display screen as illustrated in FIG. 1 in proportion to the strength of a currently transmitted signal and color a returned echo according to an underwater ultrasonic wave speed in a downward direction. Previous transmission and reception signals are drawn on the left side of the current signal. Past transmission and reception signals are drawn on the left side in sequence, and underwater information of the sea that the ship has passed is displayed on one screen. In the example of FIG. 1, the straight line at the top shows the sea surface, the line lying below is the seabed, and a fish school (indicated by a shaded area) is displayed between the sea surface and the seabed. The image in the screen is shifted to the left for each transmission, and the oldest transmission and reception echoes disappear from the screen.

RELATED ART

Patent Document

Patent Document 1: Japanese Patent No. 2567641.

SUMMARY OF THE INVENTION

Problems to Be Solved by the Invention

A conventional fish finder transmits a short pulse, and the pulse signal propagates in the sea, and a weak reflection signal from an object called a scatter in the sea such as a fish school or a relatively large reflection echo from the seabed is colored in proportion to the magnitude of the reflection signal and is displayed on the screen as one line. A transmission period thereof is such that, after a reflection echo returns from the seabed after a transmission, the next transmission is performed, and thus, cannot be shorter than a time obtained by dividing a round-trip distance to the seabed by an underwater sound speed. For example, at a place having a depth of 150 m to the seabed, a value obtained by dividing a round-trip distance of 300 m thereof by an underwater sound speed of 1500 m/s cannot be shorter than 0.2 seconds.

When trying to display an echo of a fish school in the sea or the like at a place where the seabed is sufficiently deep, the transmission period can be set to a fast transmission period assuming that there is no reflection echo from the seabed. However, for example, when transmission is performed 10 times per second, the transmission period is 0.1 seconds. However, a screen is displayed with an effective display range being a distance that an ultrasonic wave reciprocates during a time period (0.1 seconds) from the first transmission to the next transmission, that is, 75 m, which is half of a distance of 150 m obtained by multiplying the underwater sound speed of 1500 m/s by 0.1 seconds. When the transmission period is 0.1 seconds, as illustrated in FIG. 2, a display range of 75 m or more does not exist. Even when it exists, as illustrated in FIG. 3, it is only a repeated display of a range from 0 m to 75 m.

When a seabed depth is D, a transmission interval of transmission pulses is T, and $(2D/1500)<T$, as illustrated in FIG. 4A, a time difference between a transmitted pulse and a reception echo corresponds to $(2D/1500)$, and the depth can be measured from this time difference. However, when $(2D/1500)$ T, as illustrated in FIG. 4B, since a reception echo arrives after the next transmission pulse is transmitted, it is not possible to know which transmission pulse the reception echo corresponds to, and a wrong depth is measured based on a time difference (FD). Therefore, conventionally, the condition of $(2D/1500)<T$ is required.

That the transmission period cannot be shortened means that a horizontal resolution of sounding cannot be increased. A measurement resolution in a traveling direction (horizontal direction) of a ship is described below with reference to FIG. 5. A horizontal resolution $\Delta H$ (m) in a case where sounding of a depth D (m) is performed at a ship speed V (m/s) is expressed by the following formula.

$$\Delta H = VT > 2DV/1500$$

For example, when the ship sails at 10 kt ($10 \times 1.852$ km/hour) and the transmission period is 1 second, sounding data can be obtained only about every 5 m. To measure a seabed of a depth of 1,000 m, the transmission period T must be $(1,000 \times 2)/1,500 = 1.33$ seconds or more. However, since the ship advances 6.7 m after 1.33 seconds when the ship sails at 10 kt, the measurement resolution $\Delta H$ is 6.67 m.

With a conventional underwater information visualization device such as a fish finder, there is no way other than reducing the speed of the ship in order to improve the measurement resolution. Therefore, for a conventional fish finder, there is a problem that the time required for a measurement becomes long when the measurement resolution is increased.

Therefore, the present invention is intended to provide an underwater information visualization device and an underwater information visualization method that can solve the above-described problem.

Means for Solving the Problems

The present invention provides an underwater information visualization device that is installed on a moving body such as a ship traveling near a water surface and visualizes and displays information about fish in the water and the seabed using ultrasonic waves. The underwater information visualization device includes: a transmission signal generation part including a pseudo noise sequence generation circuit that generates a pseudo noise sequence signal and a modulation circuit that modulates a carrier signal with the pseudo noise sequence signal of a transmission timing to form a transmission signal; a transmission part that emits the transmission signal as an ultrasonic wave into water; a reception part that receives an echo of an ultrasonic wave; a reception signal processing part that determines an echo corresponding to a transmission signal by subjecting the echo to correlation processing with a pseudo noise sequence signal; and a display that displays an output signal of the reception signal processing part, wherein the display simultaneously displays multiple reception signals on a screen, and a transmission signal period is (2D/Vu) or less when an underwater sonic wave speed is Vu and a distance to the seabed is D.

Further, the present invention provides an underwater information visualization method in which an underwater information visualization device, which is installed on a moving body such as a ship traveling near a water surface and visualizes and displays information about fish in the water and the seabed using ultrasonic waves, includes: a transmission signal generation part including a pseudo noise sequence generation circuit that generates a pseudo noise sequence signal and a modulation circuit that modulates a carrier signal with the pseudo noise sequence signal of a transmission timing to form a transmission signal; a transmission part that emits the transmission signal as an ultrasonic wave into water; a reception part that receives an echo of an ultrasonic wave; a reception signal processing part that determines an echo corresponding to a transmission signal by subjecting the echo to correlation processing with a pseudo noise sequence signal; and a display that displays an output signal of the reception signal processing part, wherein the display simultaneously displays multiple reception signals on a screen, and a period of the transmission signal is (2D/Vu) or less when an underwater sonic wave speed is Vu and a distance to the seabed is D.

Effect of Invention

According to the present invention, the resolution of the display in the horizontal direction (time direction) can be increased. Therefore, even for a relatively small object in the sea, a shape thereof can be displayed on the screen. The effects described herein are not necessarily limited, and may be any effect described in the present invention. Further, the content of the present invention is not to be interpreted in a limited manner by the effects exemplified in the following description.

MODE FOR CARRYING OUT THE INVENTION

In the following, an embodiment of the present invention is described. The embodiment to be described below is a preferred embodiment of the present invention and has various technically preferable limitations. However, the scope of the present invention is not to be limited to these embodiments unless specifically stated in the following description that the present invention is to be limited.

Figure 1:
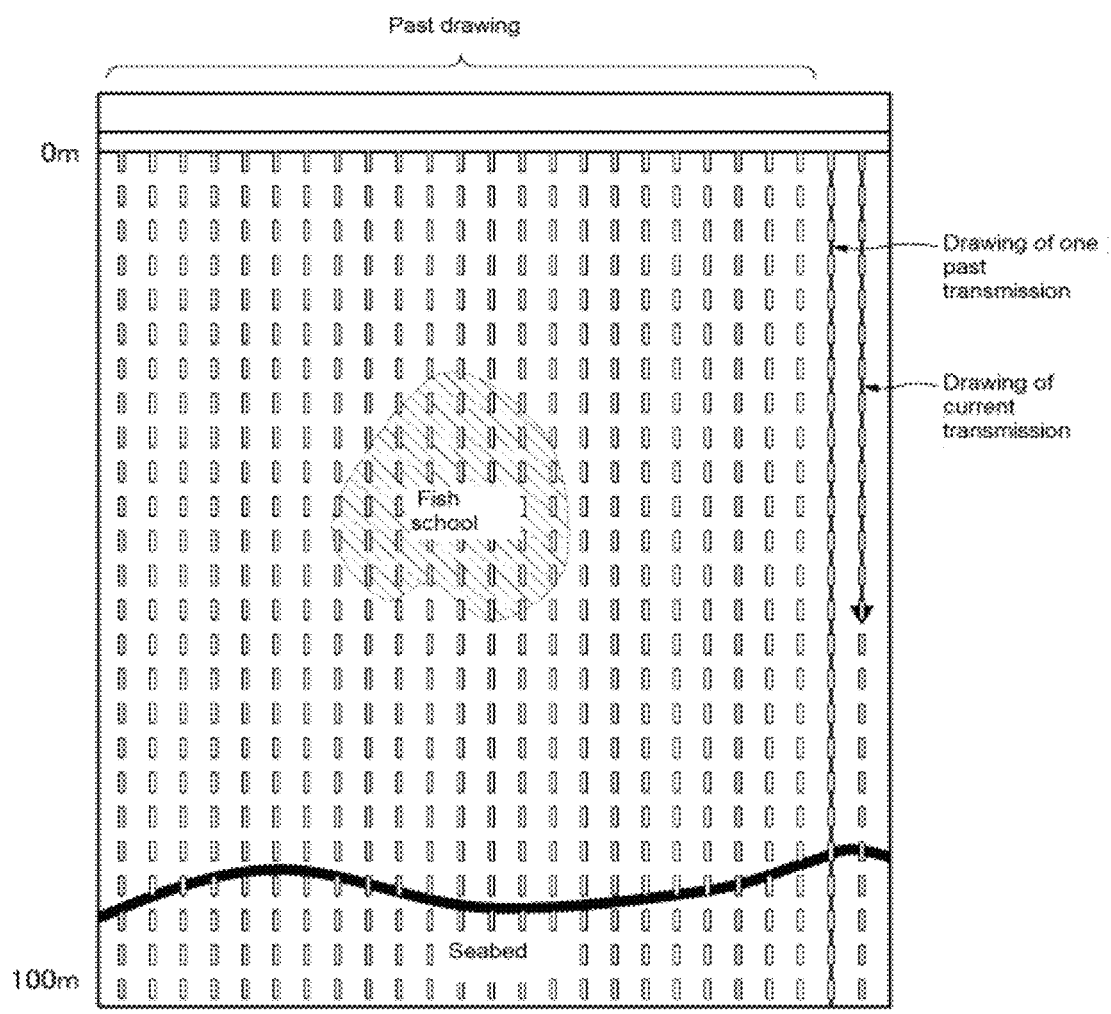
FIG. 1 is a schematic diagram illustrating a display method of a conventional fish finder.
Figure 2:
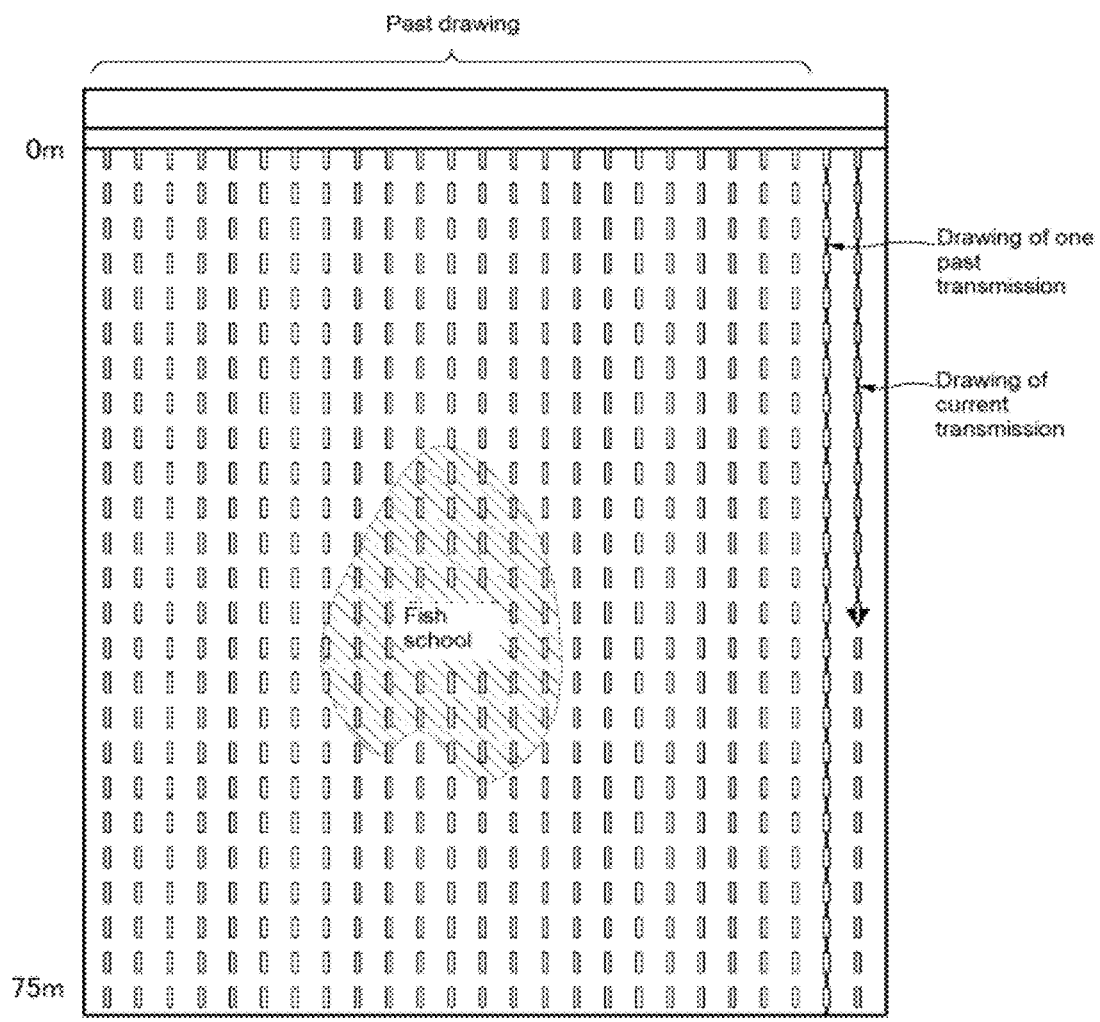
FIG. 2 is a schematic diagram illustrating the display method of the conventional fish finder.
Figure 3:
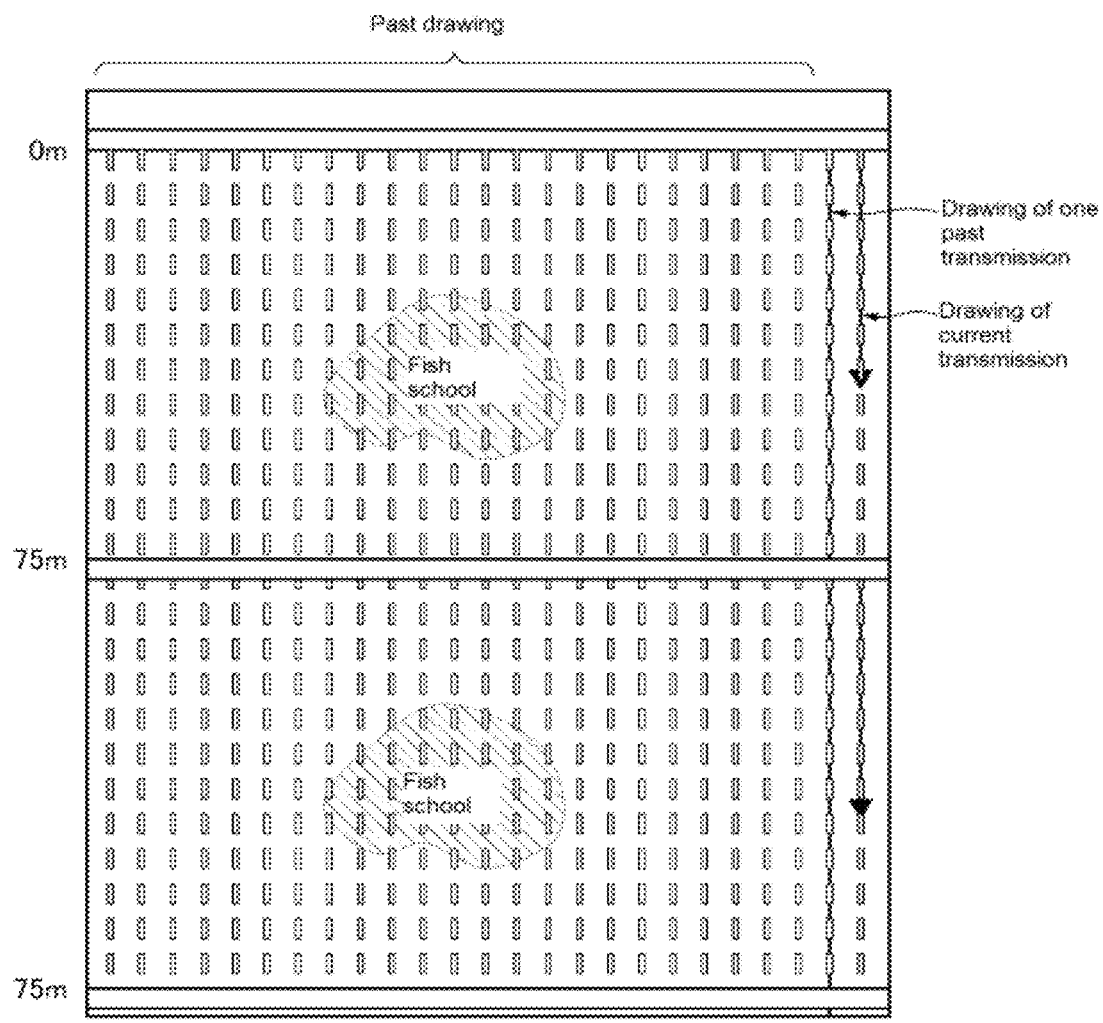
FIG. 3 is a schematic diagram illustrating the display method of the conventional fish finder.
Figure 4A:
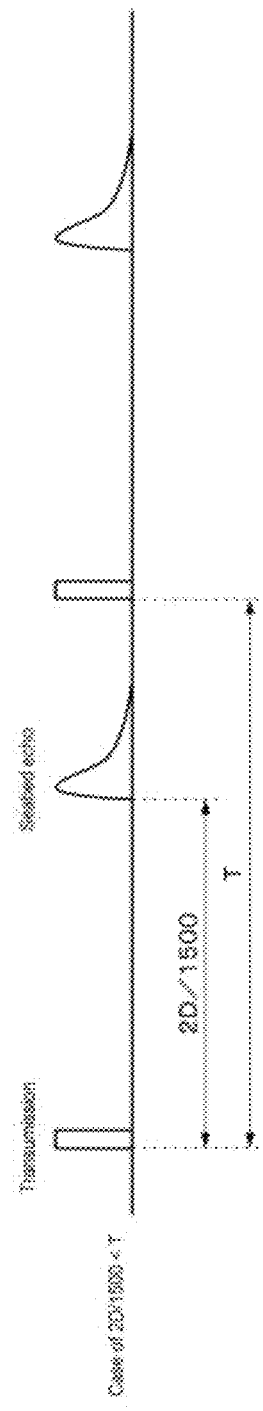
FIG. 4A and FIG. 4B are schematic diagrams illustrating an outline of an operation of the conventional fish finder.
Figure 4B:
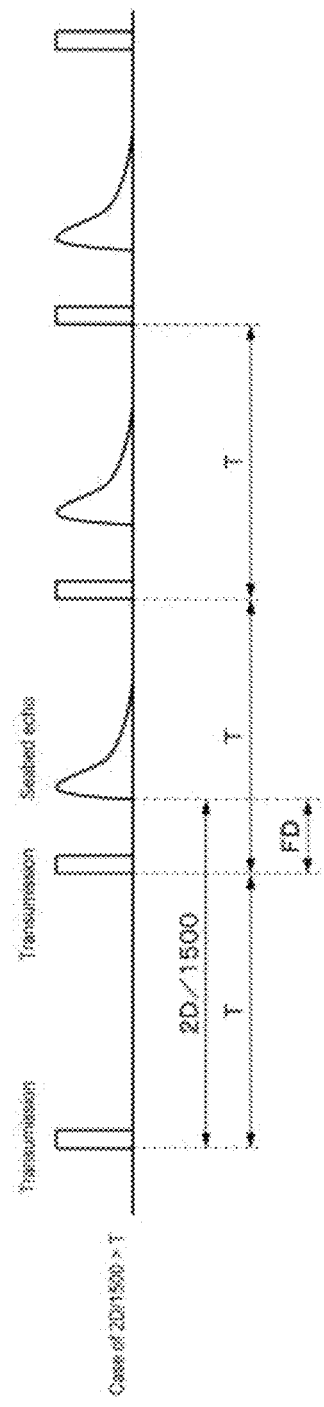
Figure 5:
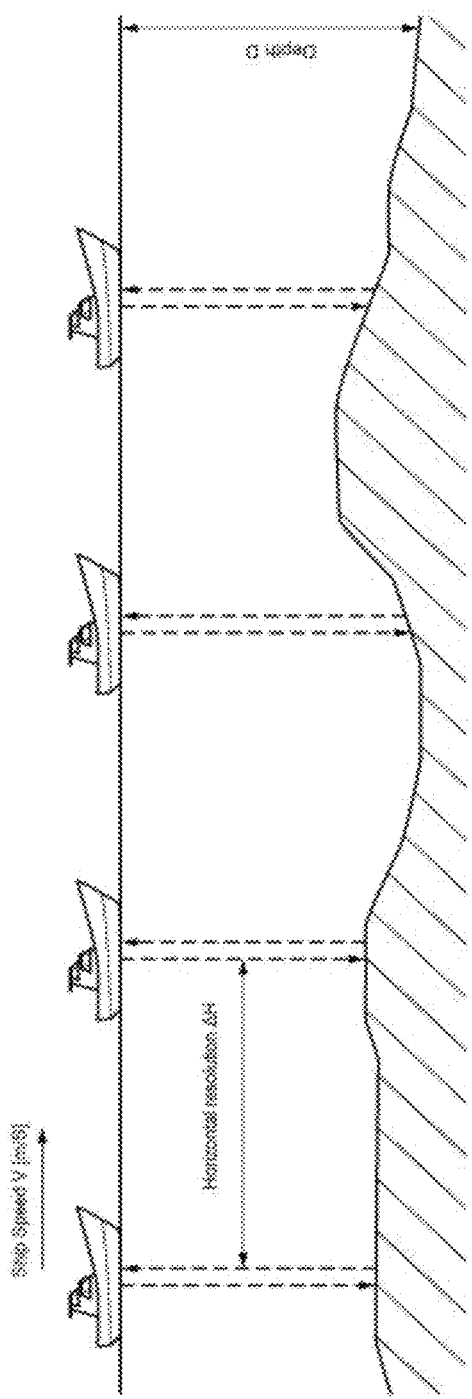
FIG. 5 is a schematic diagram illustrating an outline of an operation of the conventional fish finder.
Figure 6:
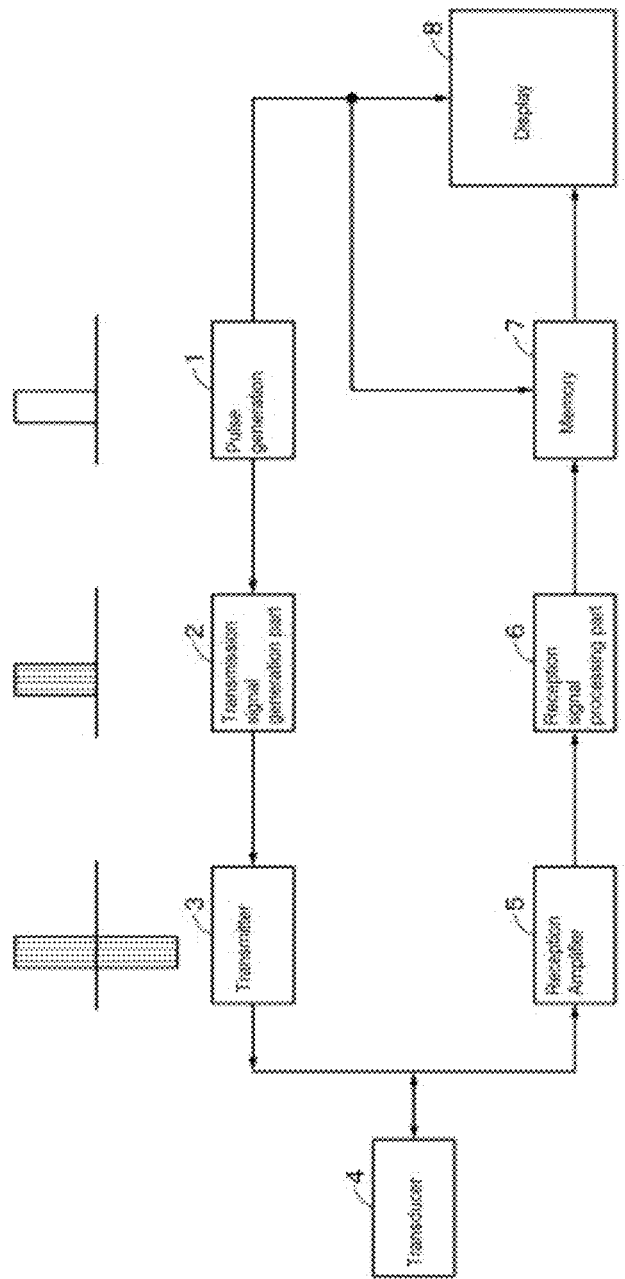
FIG. 6 is a block diagram of an embodiment of the present invention.

An embodiment of an underwater visualization device is described with reference to FIG. 6. A pulse generator 1 generates a transmission trigger pulse of a pulse signal of a certain period. The transmission trigger pulse is supplied to a transmission signal generation part 2. The transmission signal generation part 2 generates a pseudo noise sequence signal, for example, a gold code, as a transmission pulse, and digitally modulates the transmission pulse by pulse modulation, for example, BPSK (Binary Phase Shift Keying). A frequency of a carrier wave is several kHz-several hundred kHz. Further, the transmission trigger pulse is supplied to a display 8. The display 8 is a display device such as a color liquid crystal display.

A transmission signal generated by the transmission signal generation part 2 is supplied to a transmitter 3, and the transmitter 3 performs processing such as amplification. An output signal of the transmitter 3 is supplied to a transducer 4. An ultrasonic wave is emitted from the transducer 4 into the water. An echo of an emitted underwater ultrasonic wave is received by the transducer 4.

Data received from the transducer 4 is supplied to a reception amplifier 5 and is subjected to processing such as amplification, and then, is supplied to a reception signal processing part 6. The reception signal processing part 6 subjects a reception signal to correlation processing by the pseudo noise sequence signal. When a transmission signal and a pseudo noise sequence signal of a reception signal match each other, a signal with a large value is generated, and a signal after correlation processing is A/D converted and output.

As an example, in pulse modulation, one bit is formed of four periods, and each period is digitized using eight samples. Therefore, when a code of a gold code is 127 bits, one reception echo signal is (127×4×8=4064 bits). Correlation is detected by matching detection between this reception signal and a replica of 127 codes of a gold code (the replica is 4064 bits).

An output of the reception signal processing part 6 is supplied to a memory 7 having a memory area corresponding to a display area of the display 8. An output of the memory 7 is supplied to the display 8. A trigger pulse indicating a timing of a transmission pulse from the pulse generator 1 is supplied to the memory 7 and the display 8, and the display 8 displays an echo received with respect to the transmission pulse.

A transmission trigger pulse is supplied to the display 8, and the timing of the transmission trigger pulse is displayed as a transmission line (0 m) on an upper side of the screen. An output signal from the memory 7 with respect to a transmission pulse is colored and displayed so as to extend from the transmission line. Here, when an underwater sonic wave speed is Vu and a distance to a measurement target is D, a period of a transmission pulse is (2D/Vu) or less.

The underwater information visualization device described above can eliminate the conventional limitation ((2D/1500)<T) on the transmission period T. That is, the horizontal resolution is as shown by the following equation.

$$\Delta H = VT$$

For example, when the ship is sailing at 10 kt (10×1.852 km/hour) and the transmission period is 0.01 seconds, ΔH=0.05 m, and the horizontal resolution (measurement interval) can be determined regardless of a sounding depth. The horizontal resolution ΔH is determined only from the transmission period T and the ship speed V regardless of the depth. In this way, the transmission period T can be shortened, sounding is possible regardless of the depth, and a high horizontal measurement resolution can be obtained.

In particular, in the embodiment of the present invention, the resolution of the display in the horizontal direction (time direction) in the display 8 can be increased. Therefore, even for a relatively small object in the sea, a shape thereof can be displayed on the screen.

Figure 7:
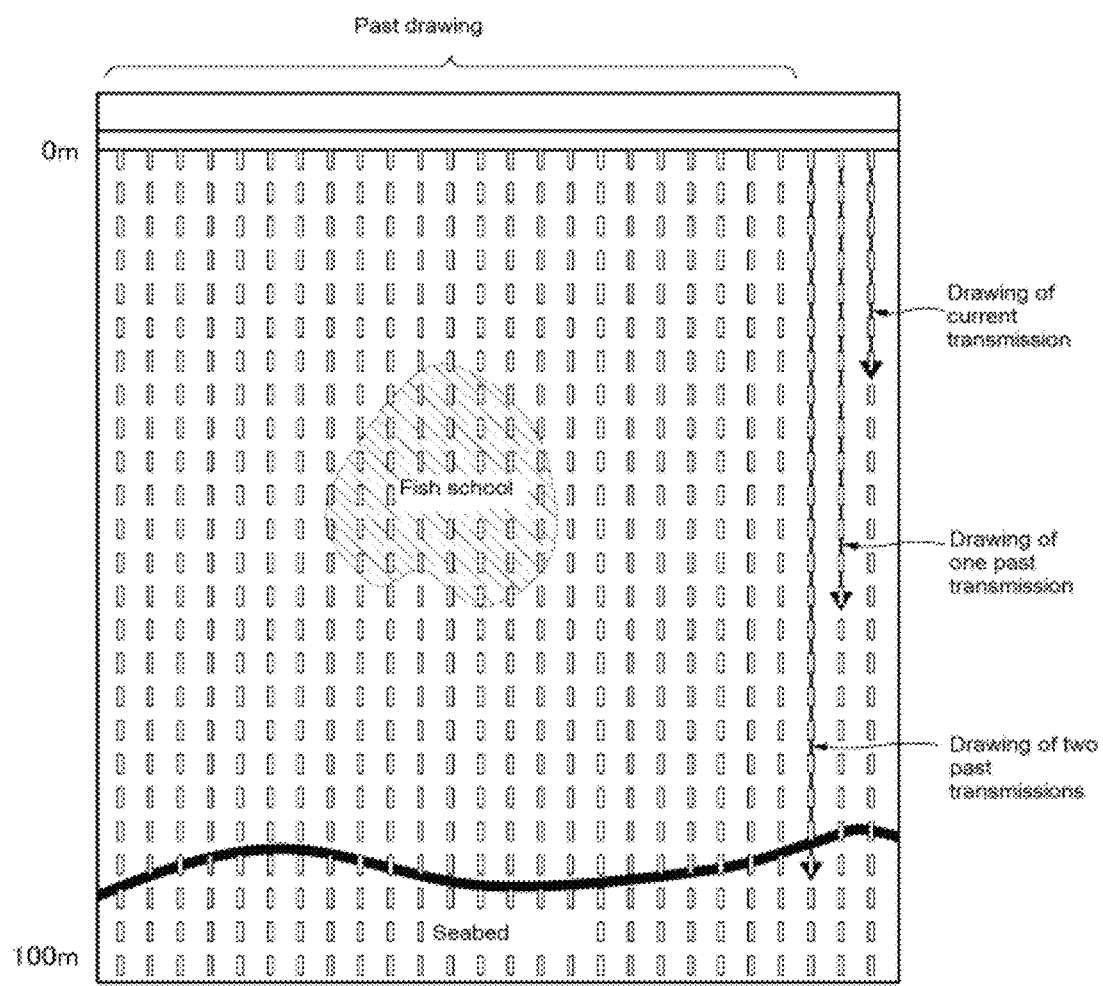
FIG. 7 is a schematic diagram for describing an example of a display method of the present invention.

The display in the display 8 is described below. In the present invention, real time display is possible without providing the memory 7. That is, as illustrated in FIG. 7, for example, taking a drawing corresponding to three temporarily continuous transmission pulses as an example, drawing of two past transmissions, drawing of one past transmission, and drawing of the current transmission are performed in parallel (overlapping) in time. The display is colored according to a level of a reception signal. That is, since the next transmission is performed and a reception echo is obtained while reception of all reception echoes of an initial transmission is still not finished, drawing of the next transmission is started when the next transmission is performed while the initial transmission and reception signals are being drawn. Further, when the next transmission is performed while the previous reception echo is being displayed, since the transmission and reception signals are drawn, multiple transmission and reception signals are always displayed on the screen.

Figure 8:
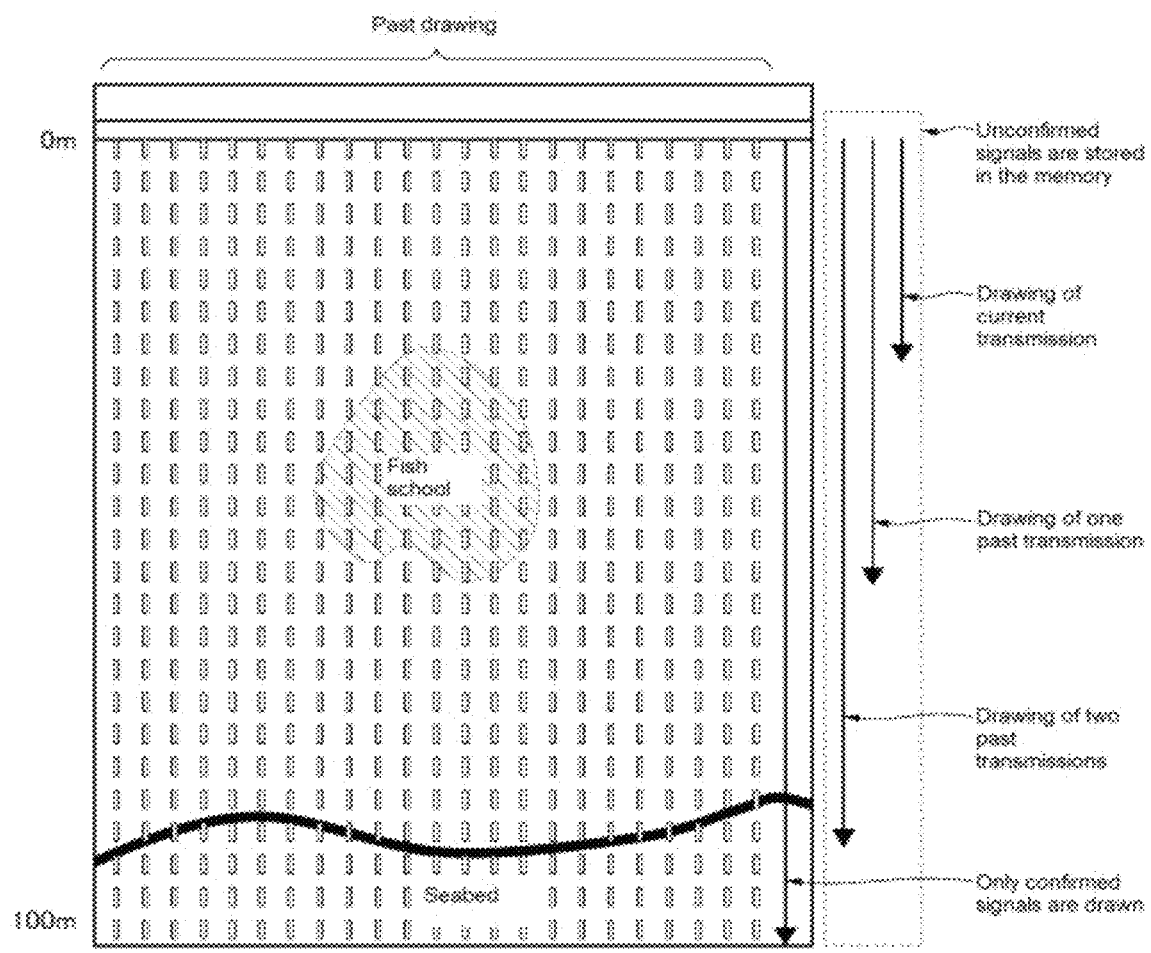
FIG. 8 is a schematic diagram for describing a display method of an embodiment of the present invention.

FIG. 8 illustrates a display method when the memory 7 is provided as in the embodiment of the present invention. Multiple temporarily continuous transmission and reception signals are sequentially stored in the memory, and only confirmed signals are drawn (displayed). Unconfirmed signals are stored in the memory 7. Since the memory 7 corresponds to a display screen of the display 8, multiple reception echoes are simultaneously displayed in the display 8.

Figure 9:
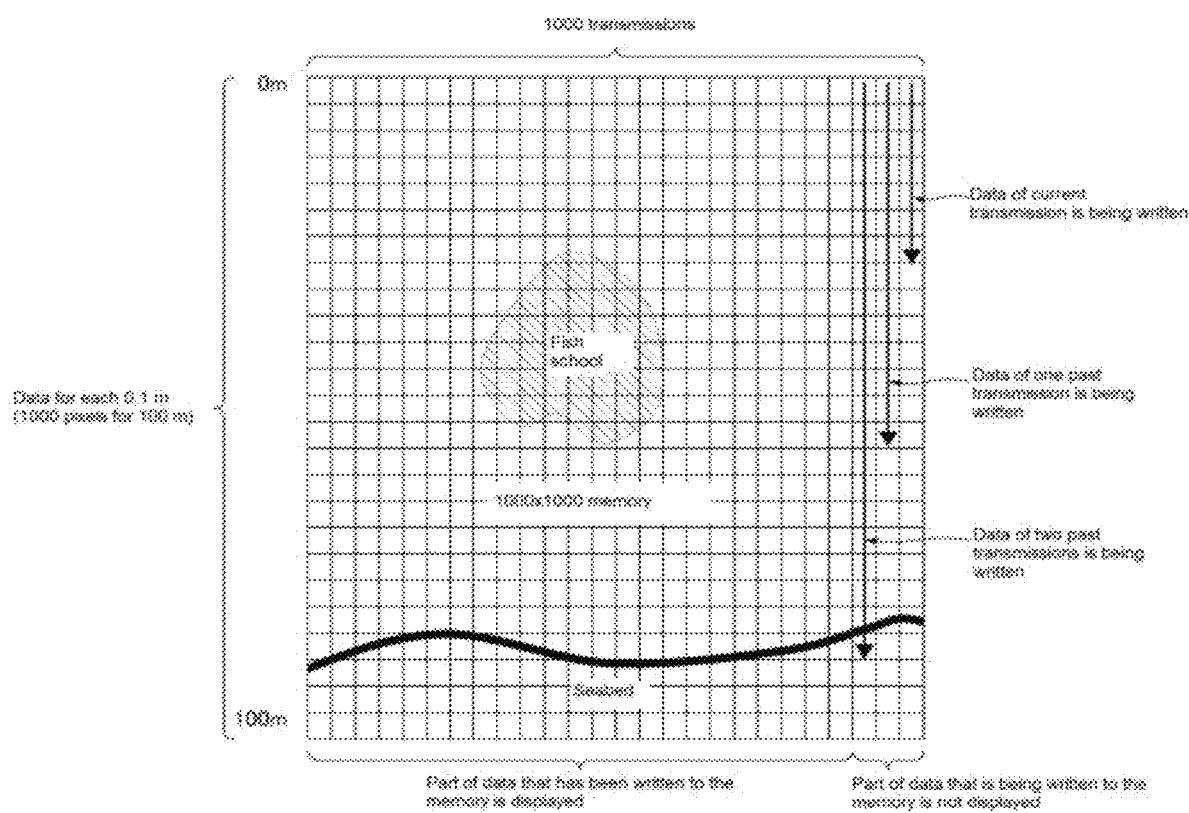
FIG. 9 is a schematic diagram for describing a display method of a structure having a memory of an embodiment of the present invention.

FIG. 9 illustrates an example of the memory 7. As an example, the memory 7 has a capacity that can store data of 1000 transmissions. In one transmission, data for each 0.1 m can be stored. When displaying underwater of a depth of 100 m, data of 1000 pixels is stored.

FIG. 7 illustrates, for example, a state in which reception data with respect to the current transmission, reception data with respect to one past transmission, and reception data with respect to two past transmissions are written to the memory 7. Further, previous reception data has been confirmed and is stored in the memory 7. A part of reception data that has been written to and stored in the memory 7 (1000−3=997 sets of reception data in the example of FIG. 9) is displayed on the display 8.

In the above-described embodiment of the present invention, since transmission can be performed with a transmission period 10 or more times that of a conventional fish finder, information obtained from this is also increased 10 or more times, sea underwater information that could not be obtained before can be obtained, and, thereby, things that were impossible before become possible.

Figure 10:
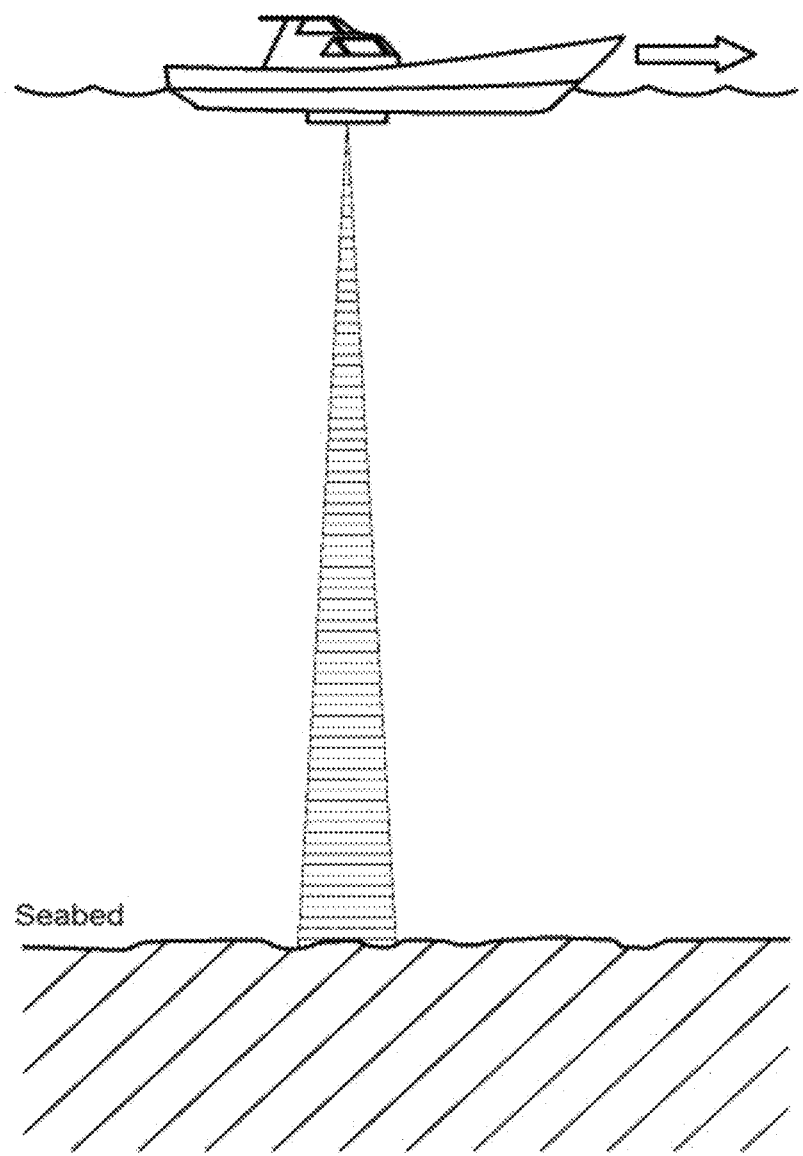
FIG. 10 is a schematic diagram illustrating an outline of a fish finder.

Next, a rocking correction device as an application example of the present invention is described. As illustrated in FIG. 10, a fish finder emits an ultrasonic wave into the water and displays reflection signals from underwater objects that exist in the water (such as fish and floating objects in the water) or the seabed on a color liquid crystal display or the like.

Figure 11:
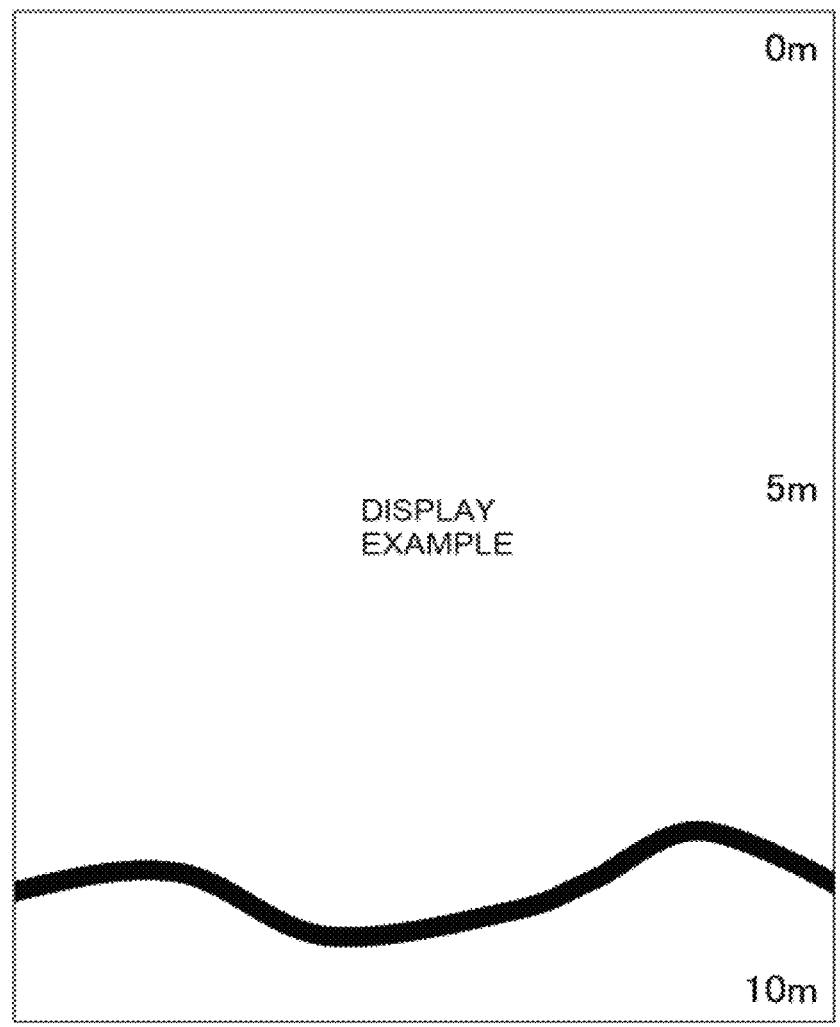
FIG. 11 is a schematic diagram illustrating a display image of a seabed echo when a ship is moving up and down due to influence of waves.

Since a transducer of a fish finder is usually fixed to a bottom of a ship, information to be displayed is affected by rocking of the ship due to waves and the like and an image is distorted. Even for an image of the seabed that has no undulation, a displayed image is undulating due to influence of waves as illustrated in FIG. 11.

It is desirable to obtain accurate images of the seabed and underwater information by detecting the rocking of the ship and performing rocking correction. Conventionally, rocking correction is performed by detecting rocking of a ship using an acceleration sensor. However, since the acceleration sensor is provided, there is problem that the cost is high. Therefore, it is desirable that rocking correction can be accurately performed without using an acceleration sensor.

Many small underwater objects called marine snow exist in the sea. Marine snow is said to be formed of floating plankton carcasses and small debris in the sea, having sizes of from several micrometers to several centimeters (or more). Marine snow can be observed with naked eyes and can be seen when diving into the sea, and shines white drifting like snow in the sea. Marine snow slowly sinks and its descending speed is said to be tens to hundreds of meters per day even for a case of a fast descending marine snow.

Therefore, the descending speed of marine snow is 1 cm or less per second. That is, marine snow is almost stationary. Further, marine snow is formed of phytoplankton and zooplankton that breed in surface water (no more than 100 m, especially no more than 50 m). In the present invention, "an underwater object that is an aggregate of small (for example, 1 mm or less) floating objects drifting in the sea and does not have an ability to move by itself and from which a reflection signal of an ultrasonic wave can be obtained," as represented by marine snow, is treated as a subject. However, in the following description, the subject is simply expressed as marine snow.

Figure 12:
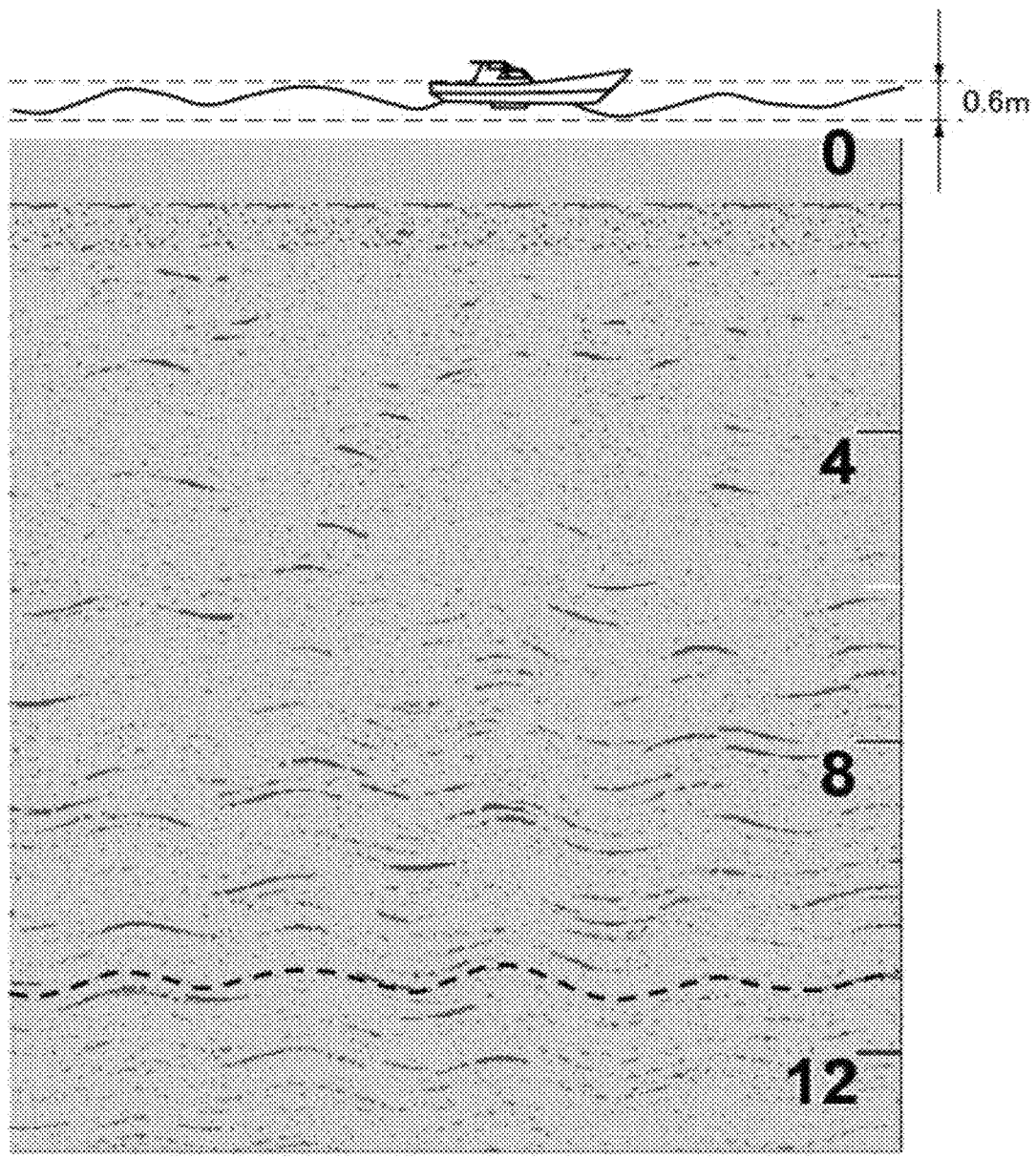
FIG. 12 is a schematic diagram illustrating an example of a display in which a marine snow echo is wavy due to rocking of the ship.

When a transmission interval of ultrasonic waves is sufficiently faster than a vertical movement of the ship, as illustrated in FIG. 12, the marine snow (especially a filamentous or linear one) is affected by rocking of the ship and is displayed as an image that undulates up and down. Since marine snow is considered to remain at a certain depth for a short time period, this image is considered to represent the rocking of the ship.

Figure 13:
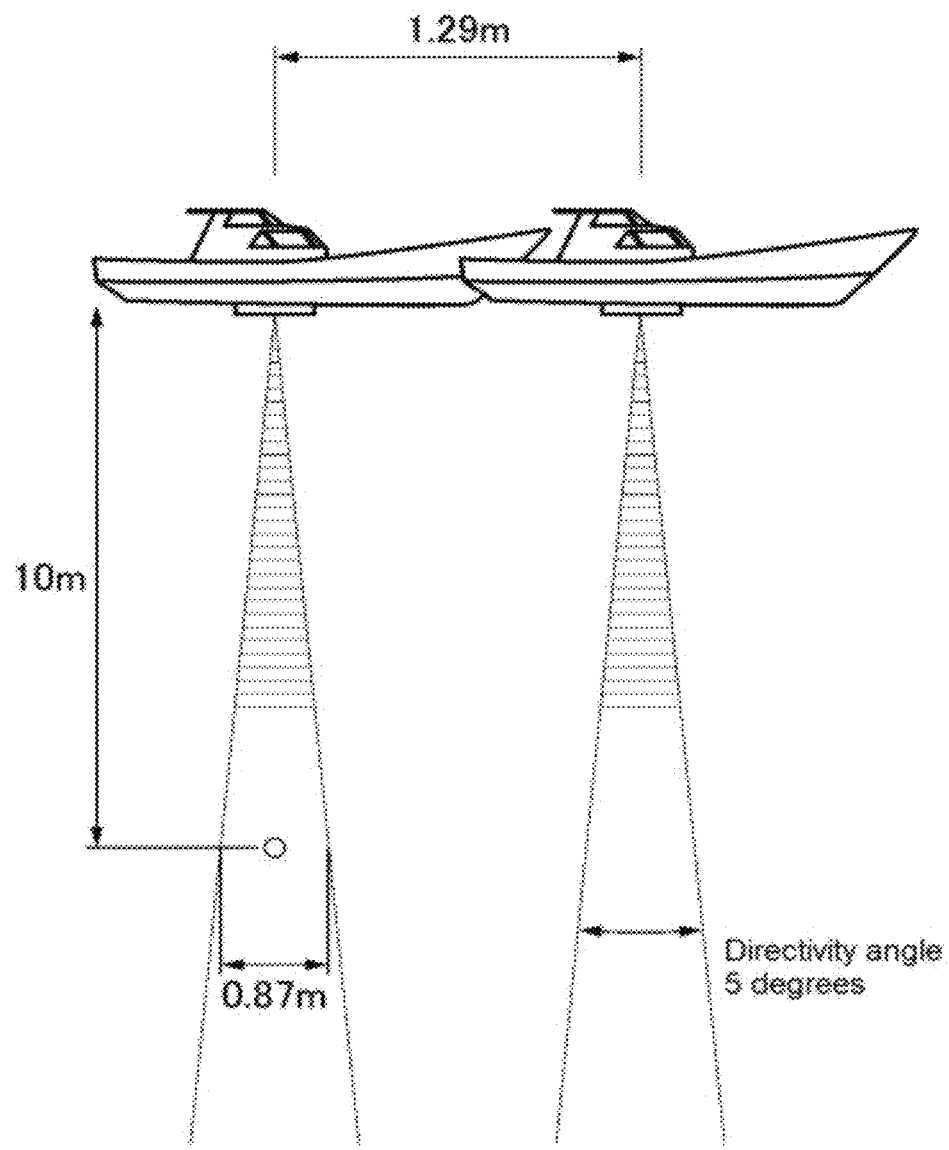
FIG. 13 is a schematic diagram for describing a detection range of a conventional fish finder.

FIG. 13 illustrates a detection operation of a conventional fish finder. Assuming the speed of the ship is, for example, 10 kt, the speed is (10×1.852 km/hour=308.7 m/minute=5.144 m/second. In a conventional fish finder, a transmission period of a range of 100 m is 4 times/second or the like, which is about once per 0.25 seconds. In 0.25 seconds, the ship advances (5.144×0.25=1.286 m). Assuming that a directivity angle of an oscillator of the fish finder is, for example, 5 degrees, as illustrated in FIG. 13, a spread of a transmission beam at 10 m directly below is 0.87 m. In this way, for a conventional fish finder, since the ship advances 1.29 m for each transmission, an ultrasonic wave hits a small object such as marine snow only once.

Figure 14:
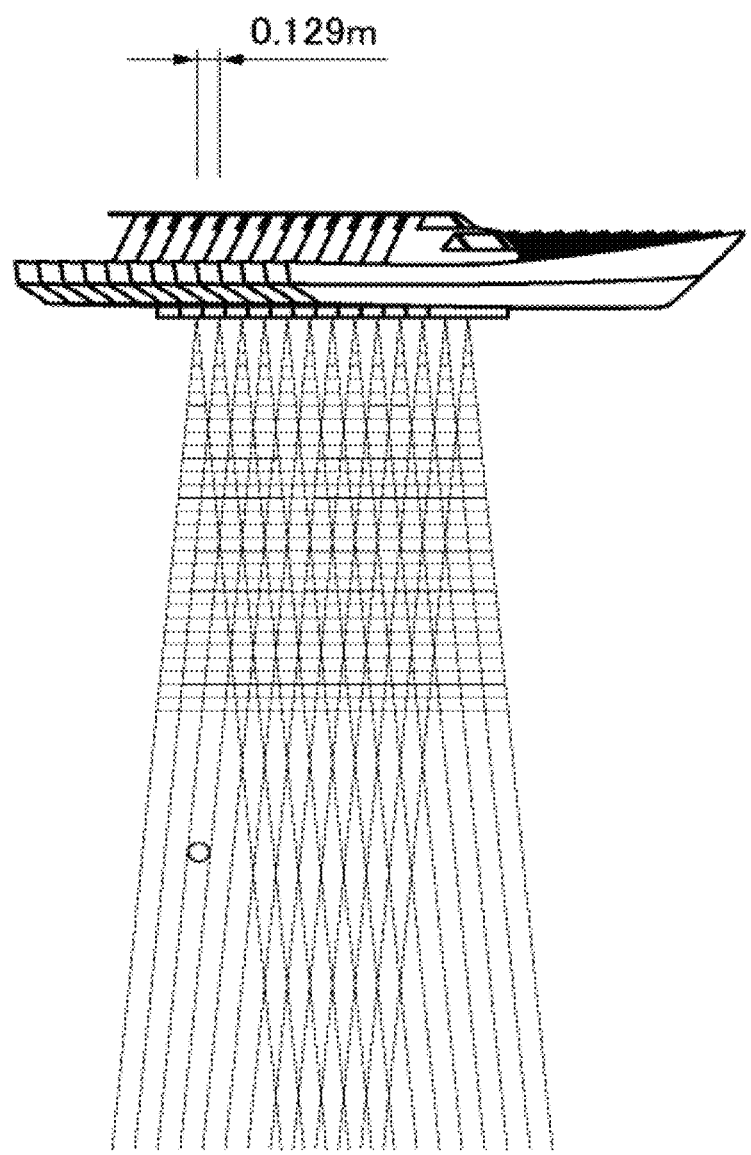
FIG. 14 is a schematic diagram for describing a detection range of an embodiment of the present invention.

In contrast, for the underwater information visualization device according to the present invention described above, the number of transmissions per second can be 10 or more times that of a conventional fish finder. That is, as illustrated in FIG. 14, a distance traveled by the ship is 0.129 m for each transmission, and, when a directivity angle of an oscillator is, for example, 5 degrees, a spread of a transmission beam at 10 m directly below is 0.87 m, and (0.87÷0.129=7.7) transmission signals hit an underwater object such as marine snow. That is, about 6 continuous echoes can be obtained for a small object such as marine snow.

10 kt is an example of a speed of a ship, and a ship speed is actually about 6 kt. In this case, the speed is about 3 m/second, and a distance traveled by the ship for each transmission is 0.386 m. In this case, (0.87÷0.0386=22.5) transmission signals hit marine snow, and thus, more continuous echoes can be obtained.

When the ship is rocking, a reception echo from a small object, for example, marine snow in a state of being almost parallel to the sea surface, can obtain an image that matches the rocking. It has been impossible to obtain such a reception echo from a small object by a conventional fish finder.

Figure 15:
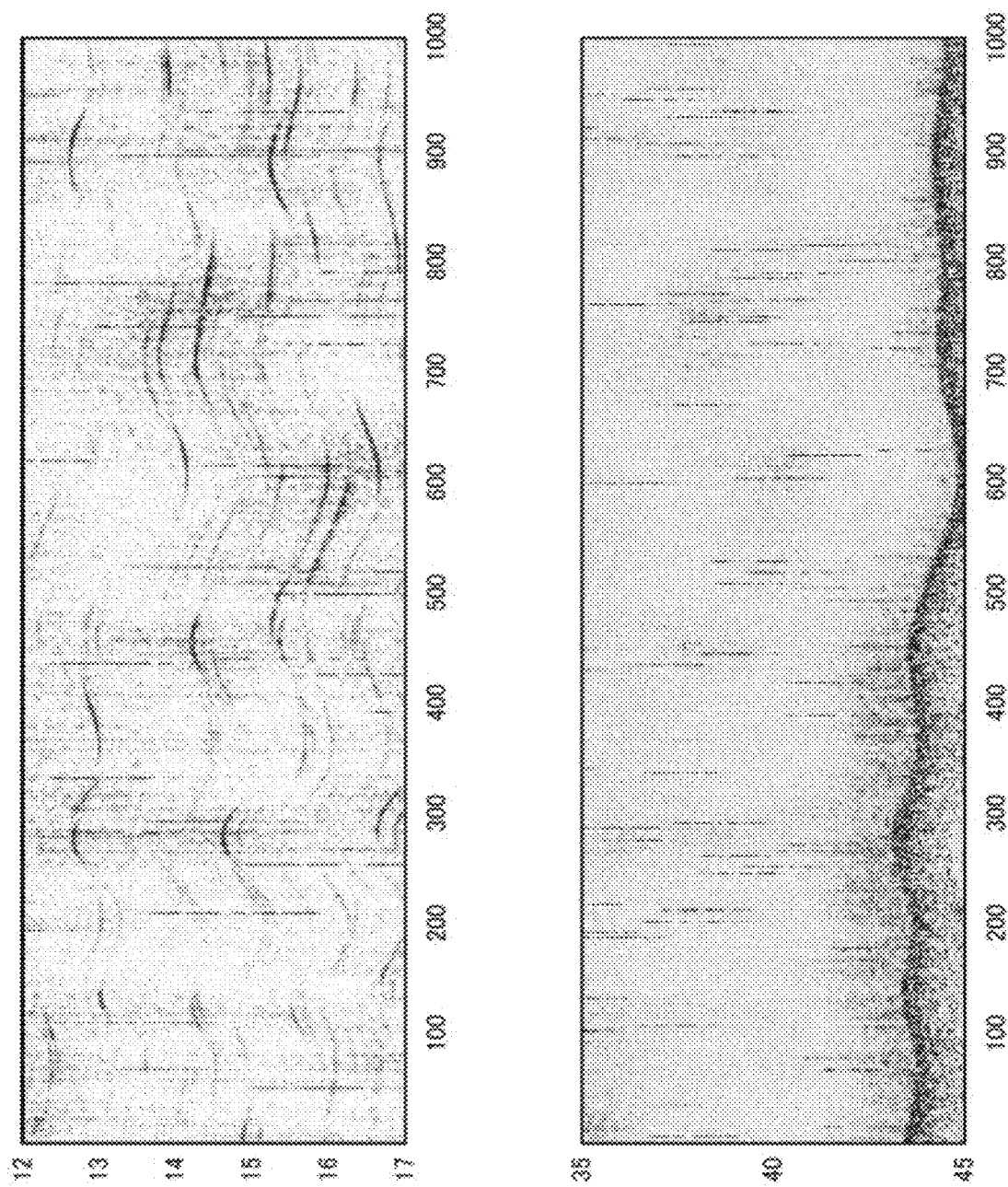
FIG. 15 is a schematic diagram used in describing marine snow and seabed images that have been subjected to rocking.

FIG. 15 is an actual image of an underwater information visualization device installed on a ship. An image of an upper part of FIG. 15 is a display image of from 12 m to 17 m where marine snow is detected, and an image of a lower part of FIG. 15 is a display image of from 35 m to 45 m where the seabed is detected. The horizontal axis indicates the number of transmissions. For example, in the image, 40 transmissions are performed per second, and thus, 1000 transmissions correspond to 25 seconds. The seabed image shows a gentle undulation.

Figure 16:
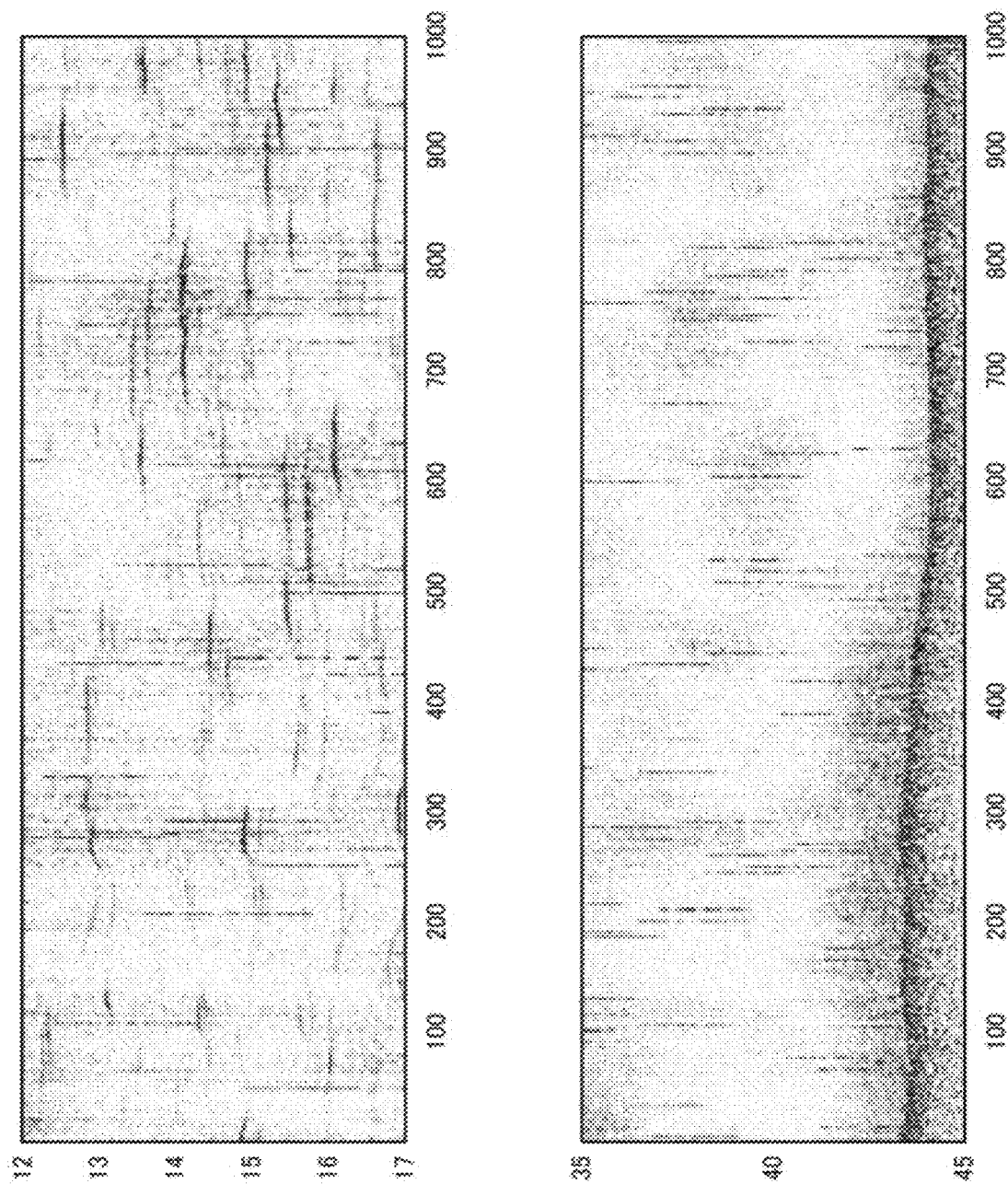
FIG. 16 is a schematic diagram used in describing marine snow and seabed images that have been subjected to rocking correction according to the present invention.

As illustrated in FIG. 16, when rocking correction is performed according to the present invention such that the image of marine snow becomes a straight line, the undulation caused by the rocking can be eliminated and an almost flat seabed topography can appear. A rocking correction method according to the present invention is a method in which an image of marine snow is used to move each reception echo such that this image becomes a straight line. That is, it is a method in which based on one reception echo, correlation between the reception echo and a reception echo at the time of the next transmission is performed, and a time difference of the correlation is used as a correction value, and the next reception echo is shifted by the time difference and is displayed. Correlation with a previous echo is sequentially repeated, and display start positions of reception echoes are adjusted one after another, and thereby, an image after rocking correction can be obtained.

The transmission period of ultrasonic waves must be at least twice a frequency component of the rocking of the ship. Therefore, for example, when a rocking frequency of a small boat is 1 Hz, to accurately capture the waves, sampling must be performed at a frequency at least twice that frequency, and thus, it is necessary to sample at a frequency of 2 Hz or higher (0.5 seconds or less when converted to a transmission period).

Figure 17:
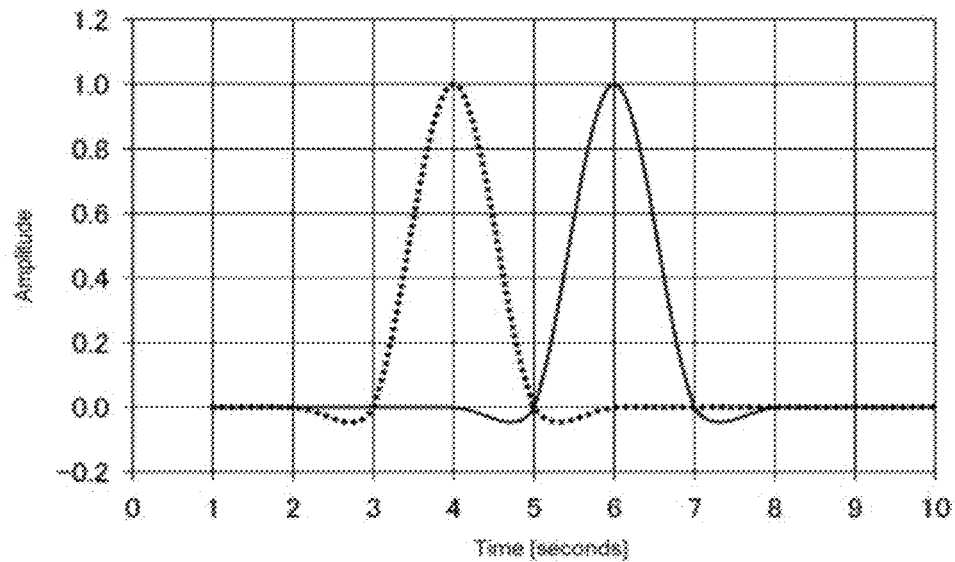
FIG. 17 is a waveform diagram used in describing correlation detection.

A method for detecting correlation in the time direction is described with reference to FIG. 17. The horizontal axis indicates passage of time, and the vertical axis indicates an amplitude. When the waveform indicated by the dotted line and the waveform indicated by the solid line are the same or similar, when the two waveforms are correlated, a maximum value occurs at a shift of 2 seconds. That is, it can be seen from the correlation result that the two waveforms are shifted by 2 seconds.

Figure 18:
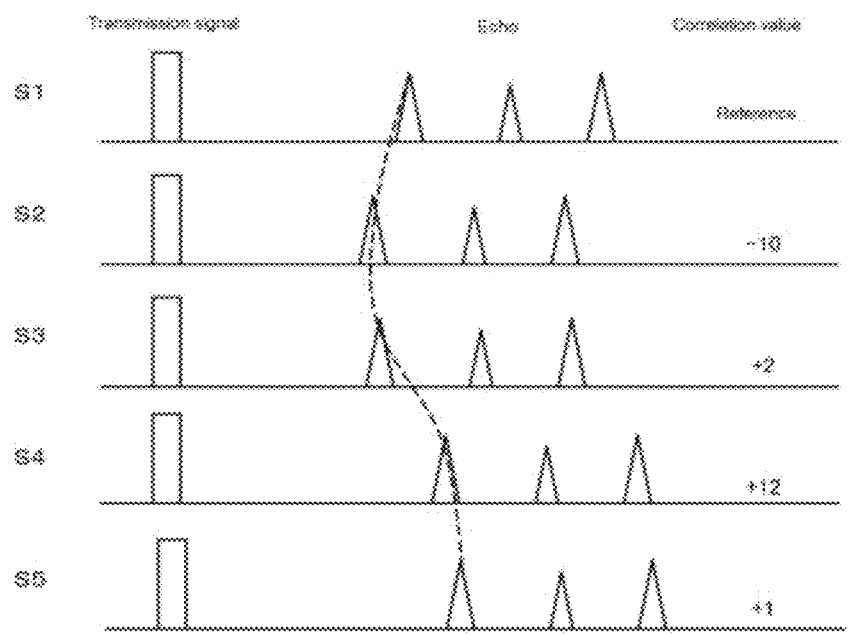
FIG. 18 is a waveform diagram used in describing a rocking correction method using marine snow.

FIG. 18 illustrates transmission signals and reception signals of marine snow echoes on the time axis. A time difference between a transmission signal and a reception signal corresponds to a position in a depth direction of the marine snow, and an amplitude of a reception signal corresponds to a size of the marine snow. As an example, it is assumed that marine snow exists at three different depth positions. Since the marine snow can be considered as being stationary in time, the change in the depth of the marine snow can be considered as being caused by the rocking of the ship.

Further, S1, S2, S3, S4, and S5 each represent a set of a sequentially transmitted transmission signal and reception signals with respect to the transmission signal. S1 is a set of a transmission signal and reception signals as a reference. These reception signals are correlated. For example, when the reception signals of the signal set S1 and the reception signals of the signal set S2 are correlated, a correlation value of, for example, −10 is obtained. The value of −10 indicates that the reception signals of S2 are 10 seconds ahead of the reception signals of S1. That is, it means that the ship descends due to the waves and the depth is reduced by 10.

Next, when the reception signals of the signal set S2 and the reception signals of the signal set S3 are correlated, a correlation value of, for example, +2 is obtained. The value of +2 indicates that the reception signals of S3 are delayed by 2 with respect to the reception signals of S2. In the following, similarly, the reception signals of the signal set S3 and the reception signals of the set S4 are correlated and a correlation value of +12 is obtained; and the reception signals of the signal set S4 and the reception signals of the set S5 are correlated and a correlation value of +1 is obtained.

As methods for obtaining a correlation value, in addition to the method described above, it is also possible that the reception signals of the reference set S1 and the reception signals of the other sets S2, S3, S4, and S5 are correlated. Further, the number of correlated signal sets is set in consideration of a transmission interval, a size of a marine snow to be detected, and the like.

Figure 19A:
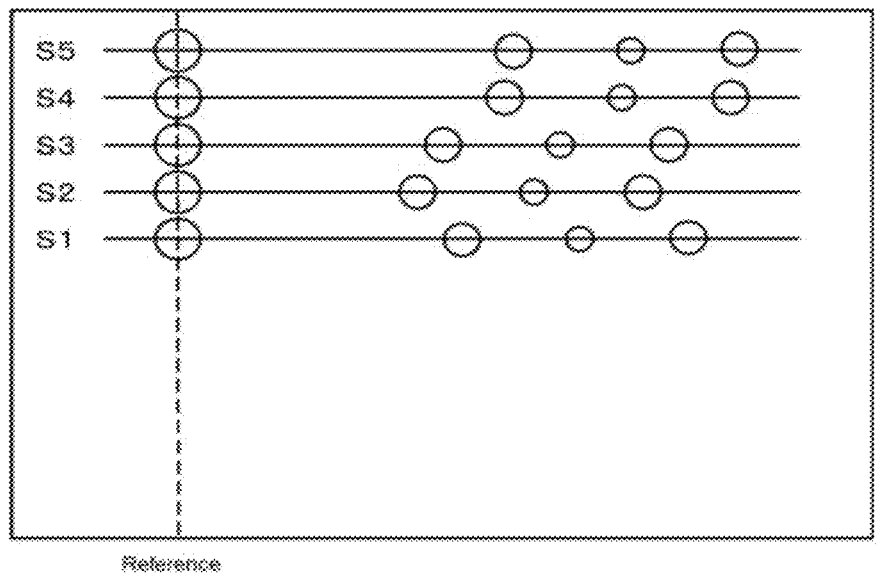
FIG. 19A and FIG. 19B are schematic diagrams respectively illustrating a display method of a conventional fish finder and a drawing method according to the present invention.

Display of a conventional fish finder and display of a fish finder according to the present invention are described below with reference to FIGS. 19A and 19B. FIG. 19A illustrates a display method of a conventional fish finder, and a display reference is a transmission signal. A transmission signal is placed at a display start position, and reception signals are sequentially colored and displayed. In this case, a reception echo is displayed with a position shifted according to the rocking of the ship.

Figure 19B:
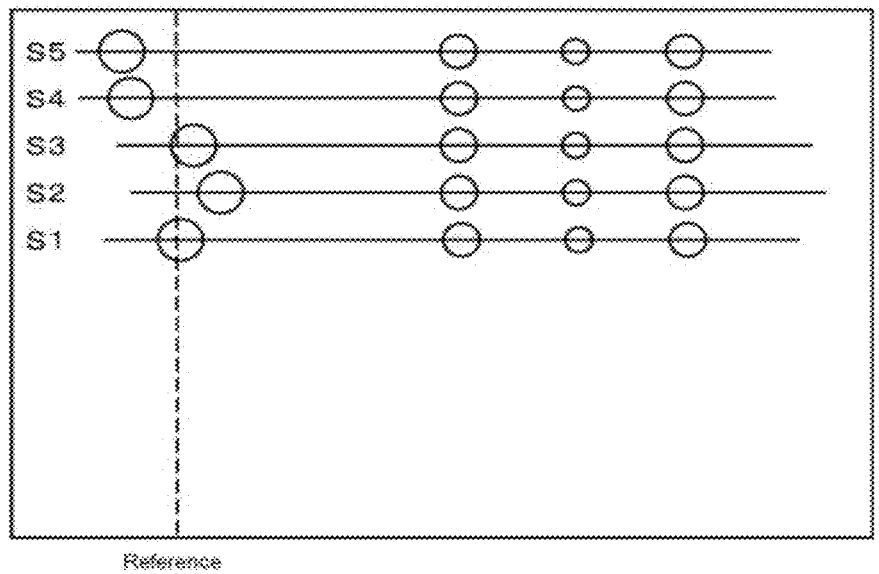

In contrast, FIG. 19B illustrates a display method after rocking correction according to the present invention. As described with reference to FIG. 18, a correlation value is obtained, and a reception signal is displayed with time shifted by an amount proportional to the correlation value. By the rocking correction processing, a display that cancels the rocking of the ship is obtained, and a marine snow echo is linearly displayed. That is, a display that has been subjected to rocking correction is obtained.

Figure 20:
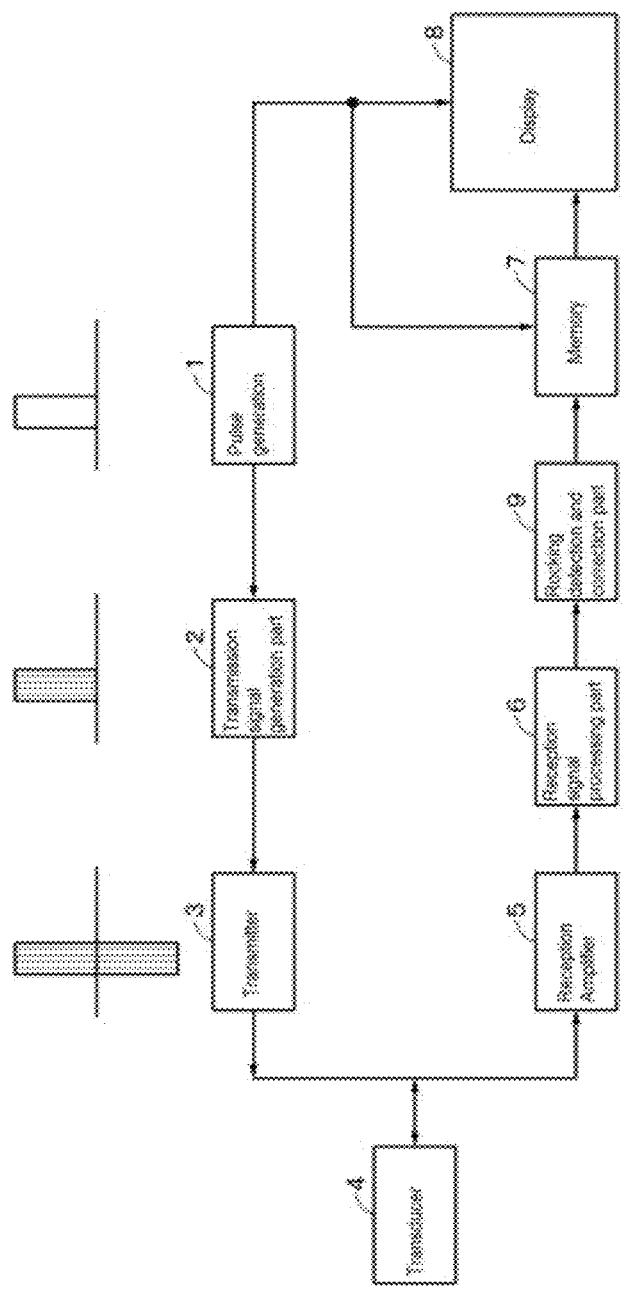
FIG. 20 is a block diagram of an example of a rocking correction device which is an application example of the present invention.

An underwater visualization device having a rocking correction function using marine snow is described below with reference to FIG. 20. The underwater visualization device has the same structure as the above-described underwater information visualization device (FIG. 6) except that a rocking detection and correction part 9 is provided between the reception signal processing part 6 and the memory 7. The rocking detection and correction part 9 performs rocking detection processing using reception echoes, and performs rocking correction in which a reception echo is shifted in a time axis direction according to a detected rocking component. An output of the rocking detection and correction part 9 is supplied to the memory 7. An output of the memory 7 is supplied to the display 8 and is displayed.

Figure 21:
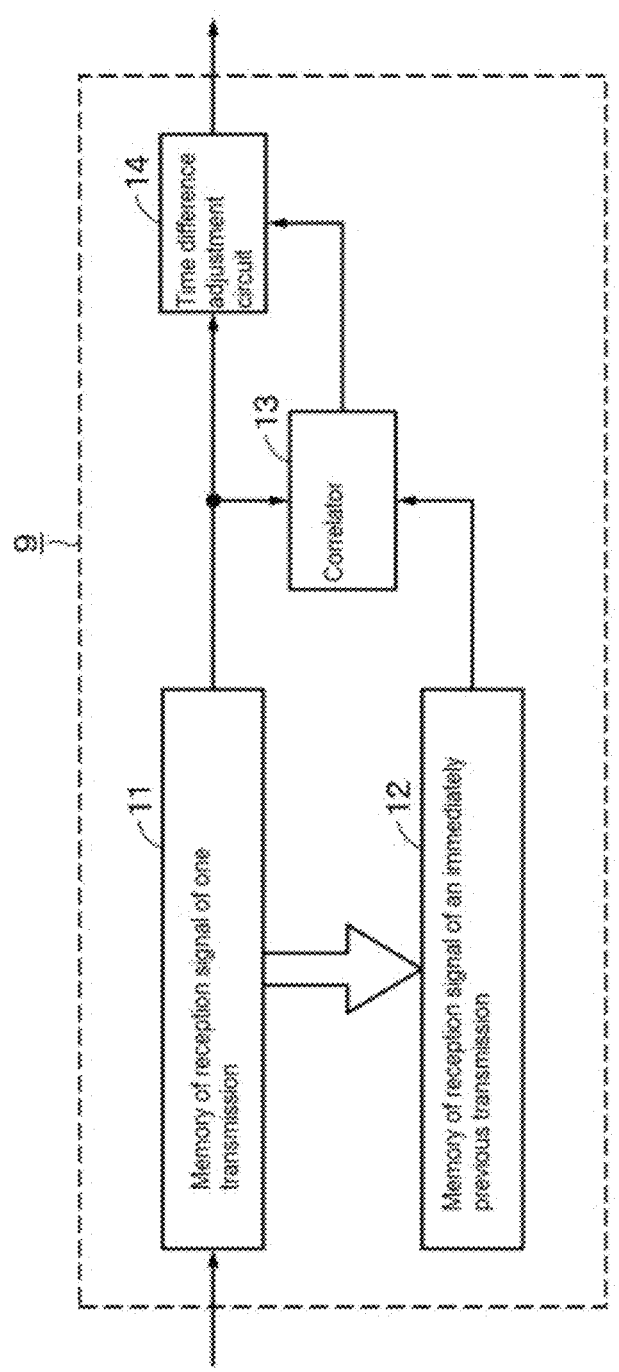
FIG. 21 is a block diagram of an example of a rocking detection and correction part.

An example of the rocking detection and correction part 9 is described below with reference to FIG. 21. The rocking detection and correction part 9 includes two memories 11 and 12, a correlator 13, and a time adjustment circuit 14. The memories 11 and 12 each store a digital reception signal for one transmission. A current reception signal is sequentially written to the memory 11. The stored data is transferred from the memory 11 to the memory 12 immediately before the next reception signal is input. For the memories 11 and 12, for example, a shift register can be used.

The correlator 13 correlates the latest reception signal stored in the memory 11 with the reception signal of the immediately previous transmission stored in the memory 12, and a time correlation value of the correlation is output from the correlator 13, and a time difference with respect to the immediately previous signal is calculated. Since this time difference is a value that occurs due to the rocking of the ship, when this time difference is input to the time adjustment circuit 14 and the reception signal is shifted by the time difference, the rocking correction is performed. In the correlator 13, the correlation is performed in a specific depth range such as a depth range in which a large amount of marine snow exists, for example, a range of surface water or a range of (5 m-20 m).

Figure 22:
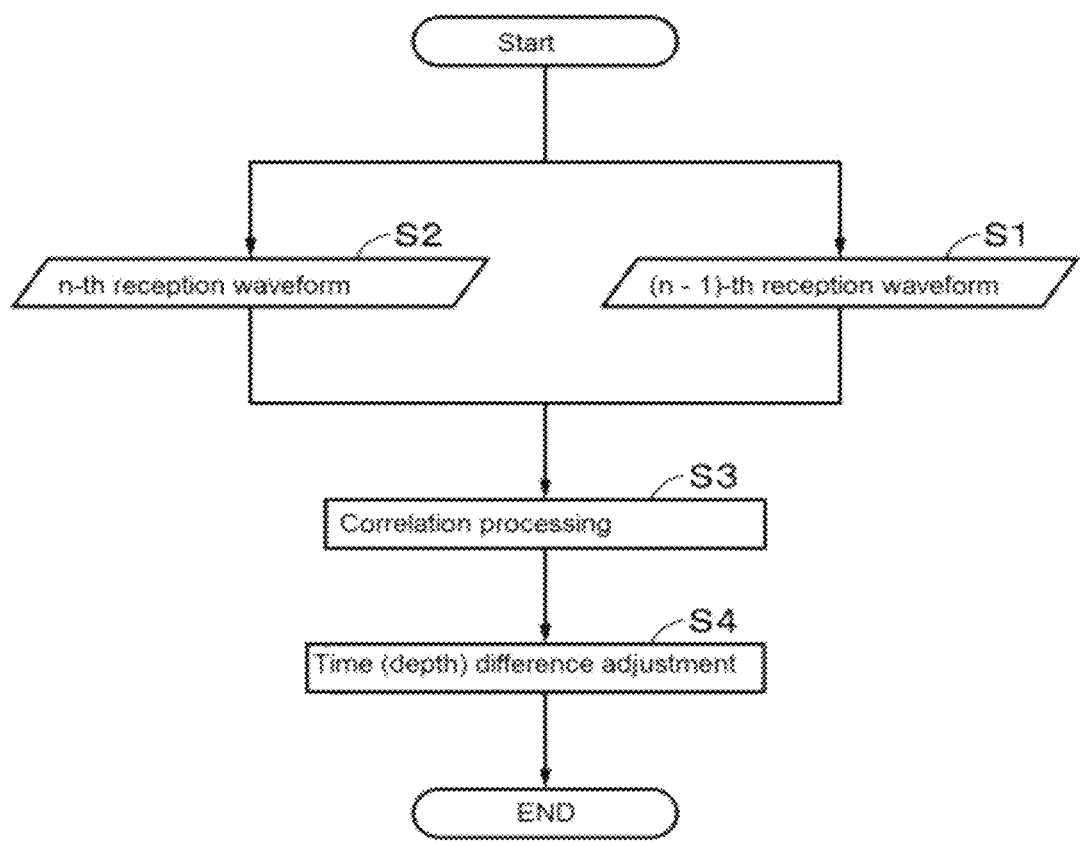
FIG. 22 is a flowchart used in describing a rocking correction process.

Processing of the rocking detection and correction part 9 is described below with reference to a flowchart of FIG. 22. When the processing is started, in Step S1, an (n−1)-th reception waveform is held in the memory 12 and, in Step S2, an n-th reception waveform is held in the memory 11. In Step S3, correlation of these waveforms is performed by the correlator 13. A time correlation value of the two reception waveforms is obtained by the correlation processing of Step S3. In Step S4, time (depth) difference adjustment is performed. In this way, the rocking caused by the waves is corrected, and a rocking component of an image displayed by the display 8 is removed.

Figure 23A:
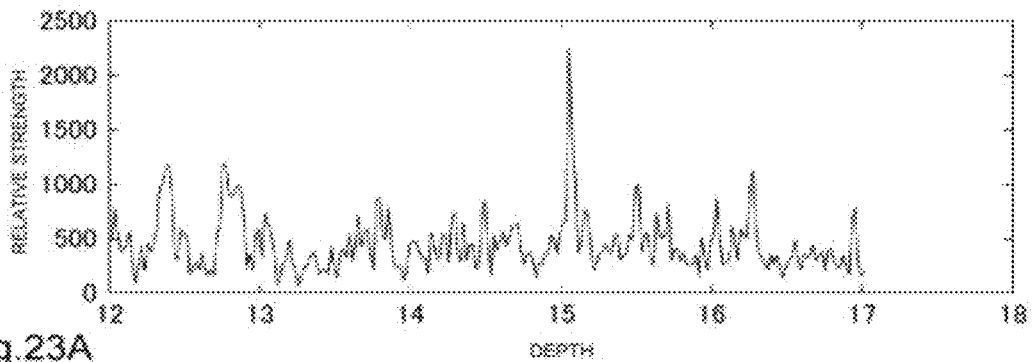
FIG. 23A, FIG. 23B, FIG. 23C, and FIG. 23D are waveform diagrams used in describing rocking correction.

FIGS. 23A-23D illustrate an example of actual reception signals with the horizontal axis representing the depth and the vertical axis representing the relative intensity of a reception signal (reception echo of marine snow). FIG. 23A is an (n−1)-th reception waveform, in which a 6 m waveform of a depth range from 12 m to 18 m is shown. An intensity peak of the reception signal exists near a depth of 15 m.

Figure 23B:
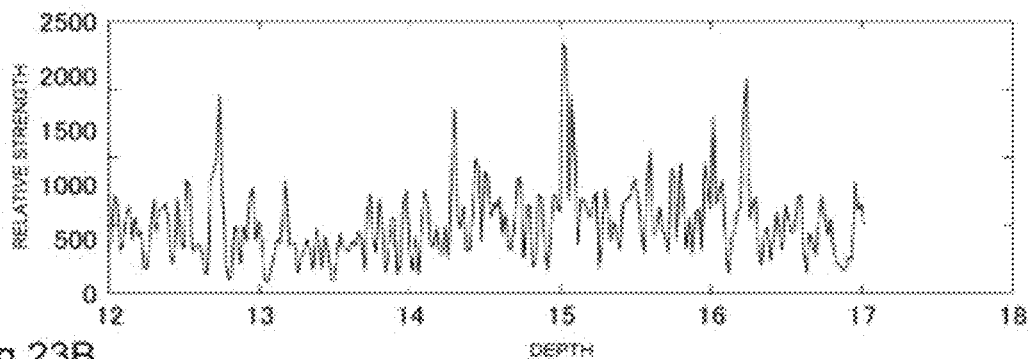
Figure 23C:
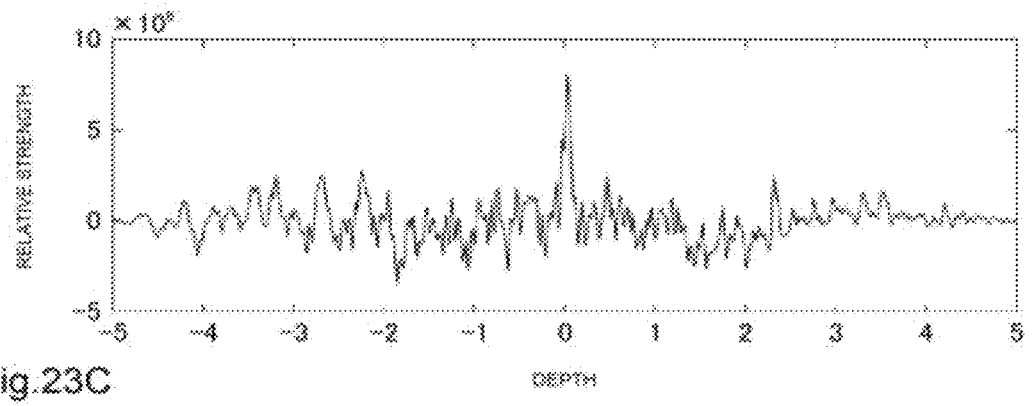
Figure 23D:
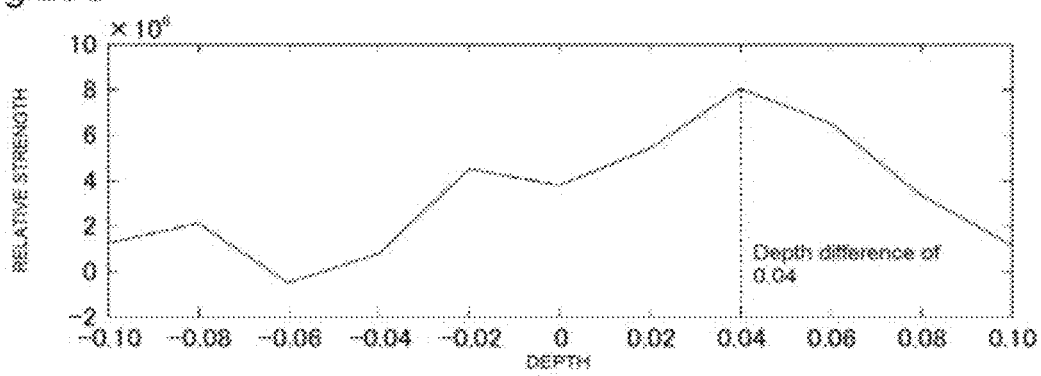

FIG. 23B is an n-th reception waveform, in which, similar to FIG. 23A, a reception echo peak occurs near the depth of 15 m. When these two reception signals are correlated, a signal waveform after the correlation processing shown in FIG. 23C is obtained. FIG. 23D is an enlarged waveform near the peak of FIG. 23C. From this enlarged waveform, it can be seen that the n-th reception waveform is shifted to a + side (a direction in which the depth increases) by 0.04 m with respect to the (n−1)-th reception waveform. That is, this shift means that the ship was lifted upward under the influence of the waves. When this difference in depth is used as a correction value, the rocking correction of the entire reception signal can be performed.

According to the rocking correction device of the present invention, for example, a rocking component due to the waves can be accurately detected, and rocking correction can be performed using the detected rocking component. Since an acceleration sensor is not used, an increase in cost can be prevented and influence of an error can be reduced.

DESCRIPTION OF REFERENCE NUMERALS

1: pulse generator
2: transmission signal generation part
4: transducer
6: reception signal processing part
7: memory
8: display
9: rocking detection and correction part
11, 12: memory
13: correlator
14: time adjustment circuit

The invention claimed is:

1. An underwater information visualization device that is installed on a ship traveling near a water surface and visualizes and displays information about fish in the water and seabed using ultrasonic waves, the underwater information visualization device comprising:
circuitry configured to
generate a pseudo noise sequence signal,
modulate a carrier signal with the pseudo noise sequence signal of a transmission timing to form a transmission signal,
emit the transmission signal as an ultrasonic wave into the water,
receive an echo of an ultrasonic wave,
determine the echo corresponding to the transmission signal by subjecting the echo to correlation processing with the pseudo noise sequence signal, and
instruct display of an output signal on a display, wherein the display simultaneously displays multiple reception signals on a screen, and a period of the transmission signal is (2D/Vu) or less when an underwater sonic wave speed is Vu and a distance to the seabed is D.

2. The underwater information visualization device according to claim 1, wherein the circuitry is further configured to generate a transmission signal as an ultrasonic wave having a frequency at least 2 times a rocking frequency of the ship, a first reception signal at a time of transmission for a predetermined depth range and a second reception signal at a time of the next transmission are correlated and a time difference as a result of the correlation is calculated, and a reception signal is displayed with the time being shifted by an amount of the time difference, and the predetermined depth range is set to a depth range in which an underwater object appears that is an aggregate of small floating objects drifting in sea and does not have an ability to move by itself.

3. The underwater information visualization device according to claim 2, wherein the display starts drawing when the next transmission is performed while drawing a first reception signal, and when the next transmission is performed while a previous reception signal is being displayed, always displays multiple transmission and reception signals on a screen such that a reception signal is drawn.

4. The underwater information visualization device according to claim 2, wherein a memory is provided between the circuitry and the display, multiple temporarily continuous reception signals are stored in the memory, and one line is drawn for each transmission in the display.

5. The underwater information visualization device according to claim 1, wherein the display starts drawing when the next transmission is performed while drawing a first reception signal, and, when the next transmission is performed while a previous reception signal is being displayed, always displays multiple transmission and reception signals on a screen such that a reception signal is drawn.

6. The underwater information visualization device according to claim 1, wherein a memory is provided between the circuitry and the display, multiple temporarily continuous reception signals are stored in the memory, and one line is drawn for each transmission in the display.

7. A underwater information visualization method implemented using an underwater information visualization device, which is installed on a ship traveling near a water surface and visualizes and displays information about fish in the water and seabed using ultrasonic waves, includes: circuitry configured to generate a pseudo noise sequence signal, modulate a carrier signal with the pseudo noise sequence signal of a transmission timing to form a transmission signal, emit the transmission signal as an ultrasonic wave into the water, receive an echo of an ultrasonic wave, determine the echo corresponding to the transmission signal by subjecting the echo to correlation processing with the pseudo noise sequence signal, and instruct display of an output signal on a display, the method comprising:

simultaneously displaying on the display multiple reception signals on a screen; and setting a period of the transmission signal to (2D/Vu) or less when an underwater sonic wave speed is Vu and a distance to the seabed is D.

8. The underwater information visualization method according to claim 7, further comprising:

generating a transmission signal as an ultrasonic wave having a frequency at least 2 times a rocking frequency of the ship;

correlating a first reception signal at a time of transmission for a predetermined depth range and a second reception signal at a time of the next transmission;

calculating a time difference as a result of the correlation;

displaying a reception signal with the time being shifted by an amount of the time difference; and setting the predetermined depth range to a depth range in which an underwater object appears that is an aggregate of small floating objects drifting in sea and does not have an ability to move by itself.

9. The underwater information visualization method according to claim 8, further comprising:

start drawing on the display when the next transmission is performed while drawing a first reception signal, and when the next transmission is performed while a previous reception signal is being displayed, always displaying multiple transmission and reception signals on a screen such that a reception signal is drawn.

10. The underwater information visualization method according to claim 8, wherein a memory is provided between the circuitry and the display, and wherein the method further comprises storing multiple temporarily continuous reception signals in the memory, and drawing one line for each transmission in the display.

11. The underwater information visualization method according to claim 7, further comprising starting drawing on the display when the next transmission is performed while drawing a first reception signal, and when the next transmission is performed while a previous reception signal is being displayed, always displaying multiple transmission and reception signals on a screen such that a reception signal is drawn.

12. The underwater information visualization method according to claim 7, wherein a memory is provided between the circuitry and the display, and wherein the method further comprises storing multiple temporarily continuous reception signals in the memory, and drawing one line for each transmission in the display.

* * * * *